(12) United States Patent
Wang et al.

(10) Patent No.: US 12,475,825 B2
(45) Date of Patent: Nov. 18, 2025

(54) DISPLAY SUBSTRATE INCLUDING SHIFT REGISTER AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN); BEIJING BOE TECHNOLOGY DEVELOPMENT CO., LTD., Beijing (CN)

(72) Inventors: Xiaolin Wang, Beijing (CN); Pengcheng Fu, Beijing (CN); Taeyup Min, Beijing (CN); Zhifu Dong, Beijing (CN); Hui Guo, Beijing (CN)

(73) Assignees: CHONGQING BOE OPTOELECTRONICS TECHNOLOGY CO., LTD., Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/637,592

(22) Filed: Apr. 17, 2024

(65) Prior Publication Data
US 2024/0428716 A1 Dec. 26, 2024

Related U.S. Application Data

(63) Continuation of application No. PCT/CN2023/091193, filed on Apr. 27, 2023.

(51) Int. Cl.
*G09G 3/3266* (2016.01)
*G09G 3/20* (2006.01)
*G11C 19/28* (2006.01)

(52) U.S. Cl.
CPC ............... *G09G 3/20* (2013.01); *G11C 19/28* (2013.01); *G09G 2300/0408* (2013.01);
(Continued)

(58) Field of Classification Search
None
See application file for complete search history.

(56) References Cited

U.S. PATENT DOCUMENTS 10,043,474 B2 8/2018 Zhao et al.
10,446,104 B2 10/2019 Wang
(Continued)

FOREIGN PATENT DOCUMENTS

CN 102637215 A 8/2012
CN 105185339 A 12/2015
(Continued)

*Primary Examiner* — Lunyi Lao
*Assistant Examiner* — Donna V Bocar
(74) *Attorney, Agent, or Firm* — Chiwin Law LLC (57) ABSTRACT

A display substrate and a display device are provided, the display substrate includes a base substrate, and a shift register and a clock signal line that are on the base substrate; the shift register includes an input circuit, an output circuit, a first control circuit, a second control circuit, a first noise reduction circuit and a second noise reduction circuit; the input circuit includes a first transistor and a second transistor, the first transistor and the second transistor are both oxide transistors, and the second node is connected to the second voltage signal only through the second control circuit, and a potential of the second node is pulled down only through the second control circuit.

18 Claims, 4 Drawing Sheets

(52) U.S. Cl.
CPC ............... *G09G 2300/0426* (2013.01); *G09G 2310/0267* (2013.01); *G09G 2310/0286* (2013.01); *G09G 2320/043* (2013.01); *G09G 2330/04* (2013.01)

(56) References Cited

U.S. PATENT DOCUMENTS

| | | |
|---|---|---|
| 10,770,163 B2 | 9/2020 | Wang |
| 11,132,927 B2 | 9/2021 | Gu et al. |
| 11,676,524 B2 | 6/2023 | Xie et al. |
| 11,830,398 B2 | 11/2023 | Yan et al. |
| 12,027,088 B2 | 7/2024 | Li |
| 2002/0150199 A1 | 10/2002 | Sakaki et al. |
| 2015/0022211 A1* | 1/2015 | Du .................. G09G 3/006 324/414 |
| 2019/0139475 A1* | 5/2019 | Wang .................. G11C 7/02 |
| 2019/0304559 A1* | 10/2019 | Wang .................. G09G 3/20 |
| 2020/0365677 A1* | 11/2020 | Yun .................. H10D 86/481 |
| 2022/0335870 A1 | 10/2022 | Gu et al. |
| 2023/0178046 A1* | 6/2023 | Shang .................. G09G 3/3674 345/100 |

FOREIGN PATENT DOCUMENTS

| | | |
|---|---|---|
| CN | 105448267 A | 3/2016 |
| CN | 108281124 A | 7/2018 |
| CN | 109410811 A | 3/2019 |
| CN | 110459185 A | 11/2019 |
| CN | 10910850 A | 3/2020 |
| CN | 111210755 A | 5/2020 |
| CN | 111210789 A | 5/2020 |
| CN | 111312729 A | 6/2020 |
| CN | 210865579 U | 6/2020 |
| CN | 111599323 A | 8/2020 |
| CN | 112164365 A | 1/2021 |
| CN | 114677946 A | 6/2022 |
| WO | WO-2021254039 A1 * | 12/2021 ............... G09G 3/20 |

* cited by examiner

DISPLAY SUBSTRATE INCLUDING SHIFT REGISTER AND DISPLAY DEVICE

CROSS-REFERENCE TO RELATED APPLICATIONS

This application is a continuation of International Application No. PCT/CN2023/091163 filed on Apr. 27, 2023, the disclosure of which is incorporated by reference herein in its entirety as part of the present application.

TECHNICAL FIELD

Embodiments of the present disclosure relate to a display substrate and a display device.

BACKGROUND

With the continuous development of display technology, the market has higher requirements for low cost, narrow frame and thin design of display devices. Under this background, the gate driver on array (GOA) technology of display substrates came into being, and has become a research hotspot of major manufacturers.

GOA technology integrates the gate driving circuit on the display substrate with pixel unit array, so that the gate driving circuit can directly provide gate driving signals for the pixel unit array without additional gate driving chip and corresponding bonding structure, thus reducing the cost and the frame width. Usually, GOA technology realizes the opening of pixel unit array row by row through cascaded shift registers, so that display products can display colorful images.

SUMMARY

The embodiments of the present disclosure provide a display substrate and a display device. On the premise of using oxide transistors, the display substrate pulls down the potential of the second node only through the second control circuit, so that after the first node is reset, the second node can be pulled up to a high level, which is staggered from the noise caused by the change of the clock signal, and it is easier for the second node to be pulled up to a high level, thus avoiding the poor driving of the gate driving circuit using the shift register; in addition, the shift register has a larger margin for the change of the threshold voltage of the transistor, and the shift register can still maintain stable performance after the reliability test, thus making the service life of the display substrate using the shift register longer.

At least one embodiment of the present disclosure provides a display substrate, which comprises a base substrate, and a shift register and a clock signal line that are on the base substrate; the shift register comprises an input circuit, an output circuit, a first control circuit, a second control circuit, a first noise reduction circuit and a second noise reduction circuit; an output end of the input circuit, a control end of the output circuit and a control end of the second control circuit are connected to a first node, an input end of the input circuit is connected to a first scanning input end, and an input end of the output circuit is connected to the clock signal line; an output end of the first control circuit, an input end of the second control circuit, a control end of the first noise reduction circuit and a control end of the second noise reduction circuit are connected to a second node, an input end of the first control circuit is configured to be connected with a first voltage signal, and an output end of the first noise reduction circuit and an output end of the second noise reduction circuit are configured to be connected with a second voltage signal; the input circuit comprises a first transistor and a second transistor, a second electrode of the first transistor is connected with a first electrode of the second transistor, a gate electrode of the first transistor is connected with a gate electrode of the second transistor and serves as a control end of the input circuit, a first electrode of the first transistor serves as the input end of the input circuit, and a second electrode of the second transistor serves as the output end of the input circuit, the first transistor and the second transistor are both oxide transistors, and the second node is connected to the second voltage signal only through the second control circuit, and a potential of the second node is pulled down only through the second control circuit.

For example, the display substrate provided by an embodiment of the present disclosure further comprises a first voltage line and a second voltage line on the base substrate, the first voltage line is configured to apply the first voltage signal and the second voltage line is configured to apply the second voltage signal; the second node is connected to the second voltage line only through the second control circuit.

For example, in the display substrate provided by an embodiment of the present disclosure, a channel width-length ratio of the first transistor ranges from 6 to 14, and a channel width-length ratio of the second transistor ranges from 6 to 14.

For example, in the display substrate provided by an embodiment of the present disclosure, the channel width-length ratio of the first transistor ranges from 8 to 12, and the channel width-length ratio of the second transistor ranges from 8 to 12.

For example, in the display substrate provided by an embodiment of the present disclosure, the shift register further comprises a third noise reduction circuit, a control end of the third noise reduction circuit is connected to the second node, an input end of the third noise reduction circuit is connected to the second electrode of the first transistor, and an output end of the third noise reduction circuit is configured to be connected to the second voltage signal; the third noise reduction circuit is configured to respond to a voltage on the second node to reduce noise for the second electrode of the first transistor by the second voltage signal.

For example, in the display substrate provided by an embodiment of the present disclosure, the third noise reduction circuit comprises a third transistor, a gate electrode of the third transistor serves as the control end of the third noise reduction circuit, a first electrode of the third transistor serves as the input end of the third noise reduction circuit, and a second electrode of the third transistor serves as the output end of the third noise reduction circuit.

For example, in the display substrate provided by an embodiment of the present disclosure, a channel length of the third transistor is greater than 5 microns.

For example, in the display substrate provided by an embodiment of the present disclosure, the shift register further comprises a reset circuit, an input end of the reset circuit is connected to the first node, and an output end of the reset circuit is connected to a second scanning input end; the reset circuit is configured to respond to a reset signal on a control end of the reset circuit to reset the first node through the second scanning input end.

For example, in the display substrate provided by an embodiment of the present disclosure, the reset circuit comprises a fourth transistor and a fifth transistor, a gate electrode of the fourth transistor is connected with a gate electrode of the fifth transistor and serves as the control end of the reset transistor, a first electrode of the fourth transistor is connected with a second electrode of the fifth transistor, a second electrode of the fourth transistor serves as the output end of the reset circuit, and a first electrode of the fifth transistor serves as the input end of the reset circuit, the fourth transistor and the fifth transistor are oxide transistors.

For example, in the display substrate provided by an embodiment of the present disclosure, a channel width-length ratio of the fourth transistor ranges from 6 to 14, and a channel width-length ratio of the fifth transistor ranges from 6 to 14.

For example, in the display substrate provided by an embodiment of the present disclosure, the channel width-length ratio of the fourth transistor ranges from 8 to 12, and the channel width-length ratio of the fifth transistor ranges from 8 to 12.

For example, in the display substrate provided by an embodiment of the present disclosure, the shift register further comprises a fourth noise reduction circuit, a control end of the fourth noise reduction circuit is connected to the second node, an input end of the fourth noise reduction circuit is connected to a first electrode of the fourth transistor, and an output end of the fourth noise reduction circuit is configured to be connected to the second voltage signal; the fourth noise reduction circuit is configured to respond to a voltage on the second node to reduce noise for the first electrode of the fourth transistor by the second voltage signal.

For example, in the display substrate provided by an embodiment of the present disclosure, the fourth noise reduction transistor comprises a sixth transistor, a gate electrode of the sixth transistor serves as the control end of the fourth noise reduction circuit, a first electrode of the sixth transistor serves as the input end of the fourth noise reduction circuit, and a second electrode of the sixth transistor serves as the output end of the fourth noise reduction circuit.

For example, in the display substrate provided by an embodiment of the present disclosure, a channel length of the sixth transistor is greater than 5 microns.

For example, in the display substrate provided by an embodiment of the present disclosure, the first control circuit comprises a seventh transistor, a first electrode of the seventh transistor serves as the input end of the first control circuit, a second electrode of the seventh transistor serves as the output end of the first control circuit, and a gate electrode of the seventh transistor serves as the control end of the first control circuit.

For example, in the display substrate provided by an embodiment of the present disclosure, the seventh transistor comprises: a first semiconductor block, comprising a first end and a second end; a second semiconductor block, comprising a third end and a fourth end; and a first floating electrode, overlapped with the first semiconductor block and located between the first end and the second end; and a second floating electrode, overlapped with the second semiconductor block and located between the third end and the fourth end, a first electrode of the seventh transistor is connected with the first end and the third end, and a second electrode of the seventh transistor is connected with the second end and the fourth end.

For example, in the display substrate provided by an embodiment of the present disclosure, the first floating electrode and the second floating electrode are in a continuous integrated structure.

For example, in the display substrate provided by an embodiment of the present disclosure, the second control circuit comprises an eighth transistor, a gate electrode of the eighth transistor serves as the control end of the second control circuit, a first electrode of the eighth transistor serves as the input end of the second control circuit, and a second electrode of the eighth transistor serves as the output end of the second control circuit.

For example, in the display substrate provided by an embodiment of the present disclosure, the output circuit comprises a ninth transistor, a gate electrode of the ninth transistor serves as the control end of the output circuit, a first electrode of the ninth transistor serves as the input end of the output circuit, and a second electrode of the ninth transistor serves as the output end of the output circuit.

For example, in the display substrate provided by an embodiment of the present disclosure, the first noise reduction circuit comprises a tenth transistor, the second noise reduction circuit comprises an eleventh transistor, a gate electrode of the tenth transistor serves as the control end of the first noise reduction circuit, a first electrode of the tenth transistor serves as the input end of the first noise reduction circuit, and a second electrode of the tenth transistor serves as the output end of the first noise reduction circuit, a gate electrode of the eleventh transistor serves as the control end of the second noise reduction circuit, a first electrode of the eleventh transistor serves as the input end of the second noise reduction circuit, and a second electrode of the eleventh transistor serves as the output end of the second noise reduction circuit.

For example, in the display substrate provided by an embodiment of the present disclosure, the shift register further comprises a first clearing circuit and a second clearing circuit; an input end of the first clearing circuit is connected with the first node, an output end of the first clearing circuit is configured to be connected with the second voltage signal, an input end of the second clearing circuit is connected with the output end, and an output end of the second clearing circuit is configured to be connected with the second voltage signal; the first clearing circuit is configured to respond to a clearing control signal to reset the first node through the second voltage signal, and the second clearing circuit is configured to respond to a clearing control signal to reset the output end through the second voltage signal.

For example, in the display substrate provided by an embodiment of the present disclosure, the first clearing circuit comprises a twelfth transistor, the second clearing circuit comprises a thirteenth transistor, a gate electrode of the twelfth transistor is a control end of the first clearing circuit, a first electrode of the twelfth transistor is the input end of the first clearing circuit, and a second electrode of the twelfth transistor is the output end of the first clearing circuit, a gate electrode of the thirteenth transistor is a control end of the second clearing circuit, a first electrode of the thirteenth transistor is the input end of the second clearing circuit, and a second electrode of the thirteenth transistor is the output end of the second clearing circuit.

At least one embodiment of the present disclosure provides a display device, which comprises the display substrate provided by any one of the above embodiments.

BRIEF DESCRIPTION OF DRAWINGS

In order to more clearly illustrate technical solutions of the embodiments of the present disclosure, the attached drawings of the embodiments will be briefly introduced below. Obviously, the attached drawings in the following description only relate to some embodiments of the present disclosure, and are not limited to the present disclosure.

DETAILED DESCRIPTION

In order to make the purpose, technical solutions and advantages of the embodiments of the present disclosure clearer, the technical solutions of the embodiments of the present disclosure will be described clearly and completely with the attached drawings. Obviously, the described embodiments are a part of the embodiments of the present disclosure, not the whole embodiments. Based on the described embodiments of the present disclosure, all other embodiments obtained by ordinary people in the field without creative labor belong to the scope of protection of the present disclosure.

Unless otherwise defined, technical terms or scientific terms used in the present disclosure shall have their ordinary meanings as understood by people with ordinary skills in the field to which the present disclosure belongs. The terms "first", "second" and the like used in the present disclosure do not indicate any order, quantity or importance, but are only used to distinguish different components. Similar words such as "including" or "comprising" mean that the elements or objects appearing before the word cover the elements or objects listed after the word and their equivalents, without excluding other elements or objects. Similar words such as "connecting" or "connected" are not limited to physical or mechanical connection, but can include electrical connection, whether direct or indirect. In addition, when the number of one component or element is not specified in the following of the embodiments of the present disclosure, it means that the component or element can be one or more, or can be understood as at least one, "at least one" means one or more, and "a plurality of" means at least two.

It should be noted that the transistors used in the embodiments of the present disclosure can be thin film transistors, field effect transistors, or other switching devices with the same characteristics. Because the source electrode and drain electrode of the transistor are symmetrical, there is no difference in structure, so the source electrode and drain electrode can be interchanged with each other. In the embodiments of the present disclosure, in order to distinguish the source electrode and the drain electrode of a transistor, one of the source electrode and the drain electrode is called a first electrode, and the other of the source electrode and the drain electrode is called a second electrode. In addition, according to the characteristics of transistors, transistors can be divided into N-type transistors and P-type transistors; when an N-type transistor is used, a high level is input to the gate electrode, the first electrode and the second electrode are conducted; when a P-type transistor is used, a low level is input to the gate electrode, the first electrode and the second electrode are conducted. The following embodiments are illustrated by taking N-type transistors as an example, but the embodiments of the present disclosure include but are not limited thereto, and the transistors in the embodiments of the present disclosure can also adopt P-type transistors. It can be understood that replacing N-type transistors with P-type transistors can be easily thought of by those skilled in the art without creative work, so it is also within the protection scope of the embodiments of the present disclosure.

The gate driving circuit (GOA) of the display substrate realizes the shift register function, and the function of the gate driving circuit is to provide a pulse signal with a certain time width to all the gate lines row by row in one frame. The time width of the pulse signal is generally one to several times of the charging time allocated to each pixel row, and the waveform of the pulse signal is usually a square wave. At the same time, a source driving circuit of the display substrate will provide video signal voltages (display data) to all pixel rows row by row in cooperation with the above pulse signals, thus realizing the normal display of an image.

Generally, the gate driving circuit includes a plurality of GOA unit circuits, which can also be called shift registers or shift register units. For small-sized and medium-sized display products, such as mobile phones, tablet computers, etc., a single-side driving mode is generally adopted, which uses one GOA unit circuit to drive each gate line, GOA unit circuits at one side drive odd-numbered gate lines, GOA unit circuits at the other side drive even-numbered gate lines, and GOA unit circuits at the two sides are turned on alternately. For large-sized and medium-sized display products, such as notebook computers, monitors, televisions, etc., a double-side driving mode or a head-to-head driving mode is generally adopted, which is to drive each gate line with one GOA unit circuit at the left side and one GOA unit circuit at the right side, and the GOA unit circuits at the two sides of the gate line simultaneously output exactly the same pulse signal to the gate line to reduce the output delay time.

As shown above, during the operation of the gate driving circuit, each GOA unit circuit will output a pulse signal to a corresponding gate line in each frame. The driving signals of the GOA unit circuit usually include a start signal (Input), a clock signal (CLK), a low-level signal (VGL), a reset signal (RESET), and an optional high-level signal (VGH). The start signal is generally generated by a certain stage of GOA unit circuit in front of the present stage of GOA unit circuit; for the first one or several GOA unit circuits, a dedicated square wave signal will be provided as the start signal, which is used to provide the start signal at the beginning of each frame, generally called STV signal.

An output signal of the GOA unit circuit is generally an output signal (OUTPUT) or a gate driving signal provided to a gate line; the start signals of the following GOA unit circuits can share the output signal or be separately generated start signals (the last GOA unit circuit does not need to output the start signal, and its reset signal is also provided by the system, or a special reset circuit will be formed to provide the reset signal, the special reset circuit generally includes several transistors and occupies an area smaller than an area of one GOA unit circuit).

Figure 1:
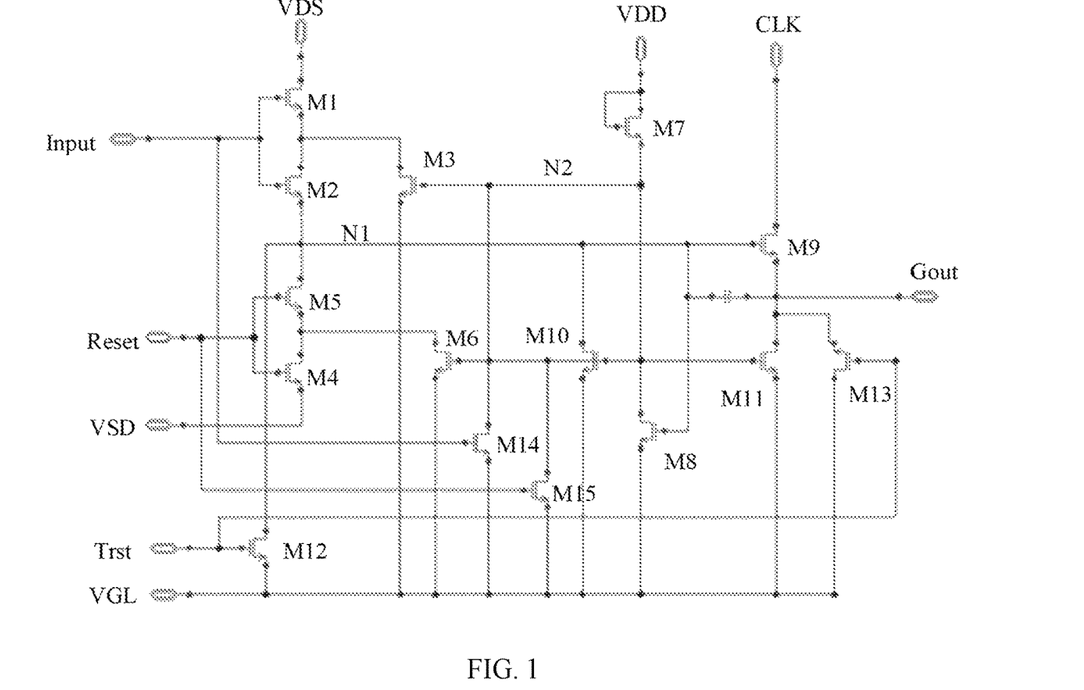
FIG. 1 is a schematic diagram of a shift register in a gate driving circuit provided by the present disclosure.
Figure 2:
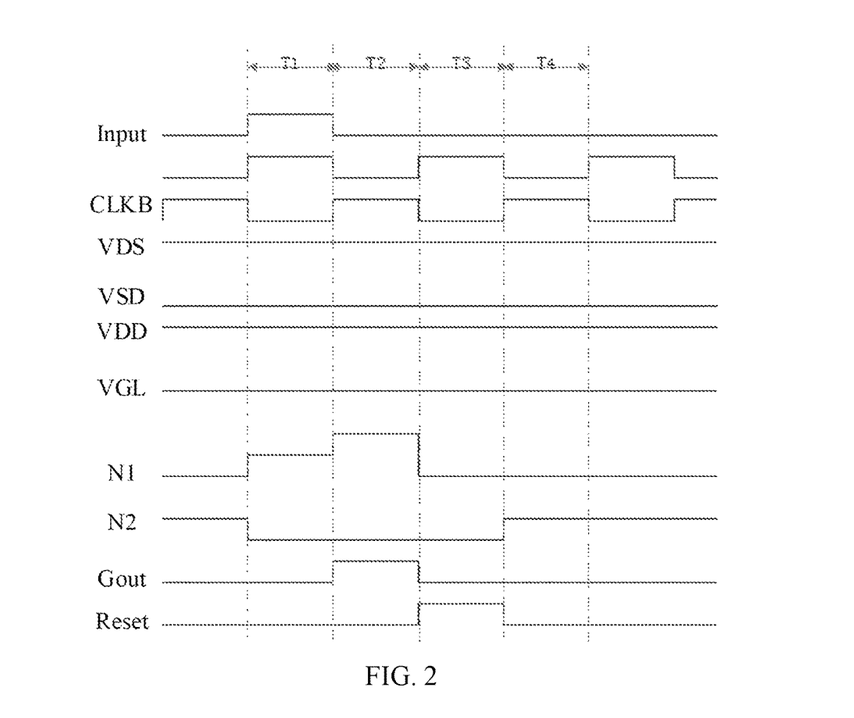
FIG. 2 is a timing diagram of driving signals of a shift register in a gate driving circuit provided by the present disclosure.

FIG. 1 is a schematic diagram of a shift register in a gate driving circuit provided by the present disclosure; and FIG. 2 is a timing diagram of driving signals of a shift register in a gate driving circuit provided by the present disclosure.

As illustrated by FIG. 1, the shift register 20 includes a first input transistor M1, a second input transistor M2, an output transistor M9, a first reset transistor M4, a second reset transistor M5, a first control transistor M7, a second control transistor M8, a first noise reduction transistor M10, a second noise reduction transistor M11, a third noise reduction transistor M3, a fourth noise reduction transistor M6, a first auxiliary reset transistor M14 and a second auxiliary reset transistor M15, a first clearing transistor M12, a second clearing transistor M13, and a capacitor C.

As illustrated by FIG. 1 and FIG. 2, a second electrode of the second input transistor M2, a first electrode of the second reset transistor M5, a gate electrode of the output transistor M9 and a first electrode of the capacitor C are connected to a first node N1, a first electrode of the output transistor M9 is connected to a clock signal line CLK, and a second electrode of the output transistor M9 serves as an output end Gout of the shift register 20; the first node N1 can be used as a pull-up node, after the second input transistor M2 writes an input signal to the first node N1, the output transistor M9 can respond to the signal on the first node N1 to output a clock signal on the clock signal line CLK as a gate driving signal. A second electrode of the first control transistor M7, a first electrode of the second control transistor M8, a gate electrode of the first noise reduction transistor M10 and a gate electrode of the second noise reduction transistor M11 are connected to a second node N2; the second node N2 can be used as a pull-down node, the first control transistor M7 can write a high-voltage signal on the first electrode of the first control transistor M7 into the second node N2, and the first noise reduction transistor M10 and the second noise reduction transistor M11 can respond to the signal on the second node N2 to respectively reduce the noise for the first node N1 and the output end Gout of the shift register.

As illustrated by FIG. 1 and FIG. 2, in T1 and T2 stages, the second node N2 is kept at a low level under the action of the first auxiliary reset transistor M14 and the second control transistor M8. In T3 stage, that is, after the gate driving signal is output from the output end Gout of the shift register 20, the first reset transistor M4 and the second reset transistor M5 respond to the reset signal RESET to reset the first node N1. At the same time, the second auxiliary reset transistor M15 also resets the second node N2 in response to the reset signal RESET, so that the second node N2 also maintains a low level in T3 stage. In T4 stage, the second node N2 needs to maintain a high level to control the first noise reduction transistor M10 and the second noise reduction transistor M11 to respectively reduce the noise for the first node N1 and the output end Gout of the shift register. However, in T3 stage, the second auxiliary reset transistor M15 also resets the second node N2 in response to the reset signal RESET, which leads to the second node N2 not being pulled high in this time period. In T4 stage, the first node N1 is affected by the noise of the clock signal, which makes it difficult for the second node N2 to be pulled high, and leads to poor driving of the gate driving circuit using the shift register. Especially, after the reliability test, due to the above reasons, the gate driving circuit using this shift register is more likely to cause poor driving.

In view of the above problems, embodiments of the present disclosure provide a display substrate and a display device. The display substrate includes a base substrate, a shift register and a clock signal line that are arranged on the base substrate; the shift register includes an input circuit, an output circuit, a first control circuit, a second control circuit, a first noise reduction circuit and a second noise reduction circuit; an output end of the input circuit, a control end of the output circuit and a control end of the second control circuit are connected to a first node, an input end of the input circuit is connected to a first scanning input end, and an input end of the output circuit is connected to the clock signal line; an output end of the first control circuit, an input end of the second control circuit, a control end of the first noise reduction circuit and a control end of the second noise reduction circuit are connected to a second node, an input end of the first control circuit is configured to be connected with a first voltage signal, and an output end of the first noise reduction circuit and an output end of the second noise reduction circuit are configured to be connected with a second voltage signal; the input circuit includes a first transistor and a second transistor, a second electrode of the first transistor is connected with a first electrode of the second transistor, a gate electrode of the first transistor is connected with a gate electrode of the second transistor and serves as a control end of the input circuit, a first electrode of the first transistor serves as the input end of the input circuit, and a second electrode of the second transistor serves as the output end of the input circuit, the first transistor and the second transistor are both oxide transistors, and the second node is connected to the second voltage signal only through the second control circuit, and potential of the second node is pulled down only through the second control circuit. Therefore, on the premise of using the oxide transistors, the display substrate pulls down the potential of the second node only through the second control circuit, so that after the first node is reset, the second node can be pulled up to a high level, which is staggered from the noise caused by the change of the clock signal, and it is easier for the second node to be pulled up to a high level, thus avoiding the poor driving of the gate driving circuit using the shift register; in addition, the shift register has a larger margin for the change of the threshold voltage of the transistor, and the shift register can still maintain stable performance after the reliability test, thus making the service life of the display substrate using the shift register longer.

Hereinafter, the display substrate and the display device provided by the embodiments of the present disclosure will be described in detail with reference to the drawings.

Figure 3:
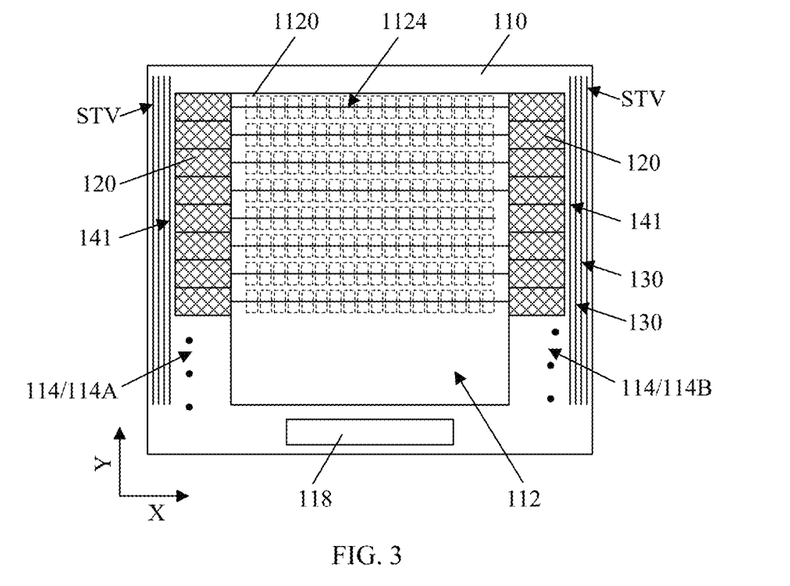
FIG. 3 is a schematic diagram of a display substrate provided by an embodiment of the present disclosure.
Figure 4:
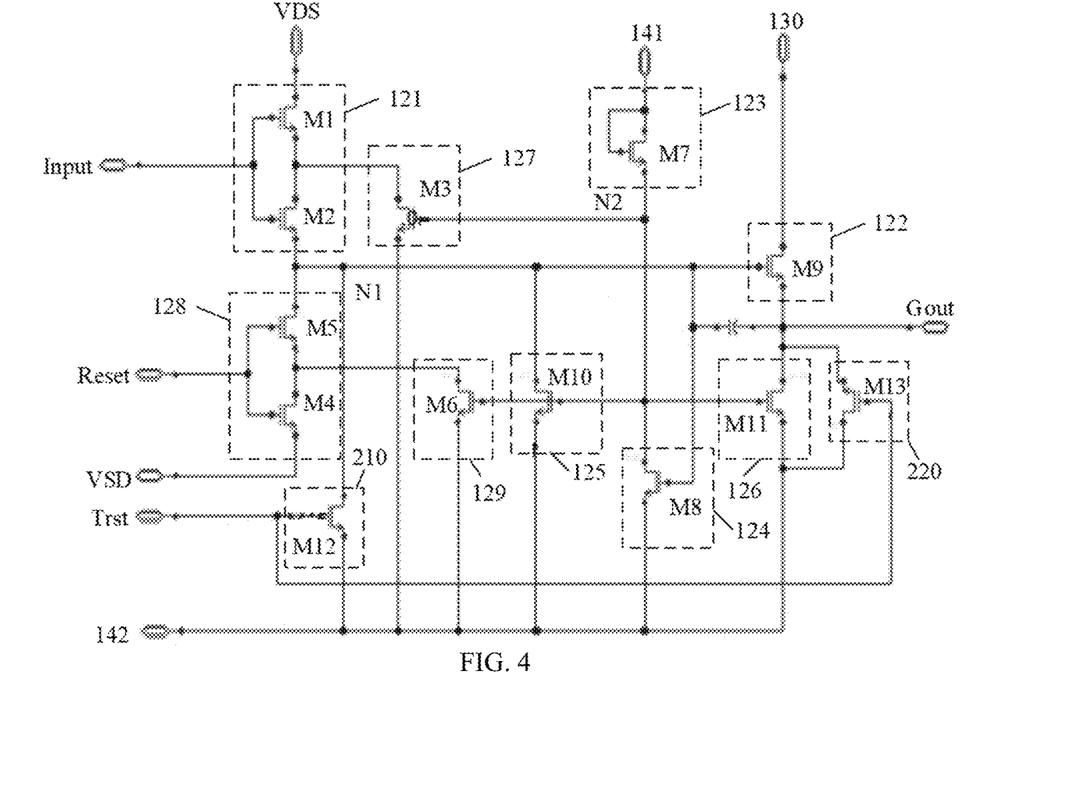
FIG. 4 is a schematic diagram of a shift register in a display substrate provided by an embodiment of the present disclosure.

An embodiment of the present disclosure provides a display substrate. FIG. 3 is a schematic diagram of a display substrate provided by an embodiment of the present disclosure; FIG. 4 is a schematic diagram of a shift register in a display substrate according to an embodiment of the present disclosure; and FIG. 5 is a timing diagram of driving signals of a shift register in a display substrate according to an embodiment of the present disclosure.

As illustrated by FIG. 3 and FIG. 4, the display substrate 100 includes a base substrate 110, and a shift register 120 and a clock signal line 130 that are arranged on the base substrate 110. The shift register 120 includes an input circuit 121, an output circuit 122, a first control circuit 123, a second control circuit 124, a first noise reduction circuit 125 and a second noise reduction circuit 126. It should be noted that the display substrate 100 may include a plurality of shift registers 120, and the plurality of shift registers 120 are cascaded to form a gate driving circuit, that is, a GOA (Gate On Array) circuit.

As illustrated by FIG. 3, the base substrate 110 includes a display region 112 and a peripheral region 114, and the peripheral region 114 includes a first sub-peripheral region 114A and a second sub-peripheral region 114B which are located at two sides of the display region 112; the shift register 120 may be arranged in the first sub-peripheral region 114A and the second sub-peripheral region 114B, that is, at the left and right sides of the display region 112. The display region 112 includes a plurality of gate lines 1124 and a plurality of sub-pixels 1120; the plurality of gate lines 1124 are used to drive the plurality of sub-pixels 1120. The peripheral region 114 of the base substrate 110 may further include a bonding region 118, which is located below the display region 112 for bonding with an external driving IC.

Figure 5:
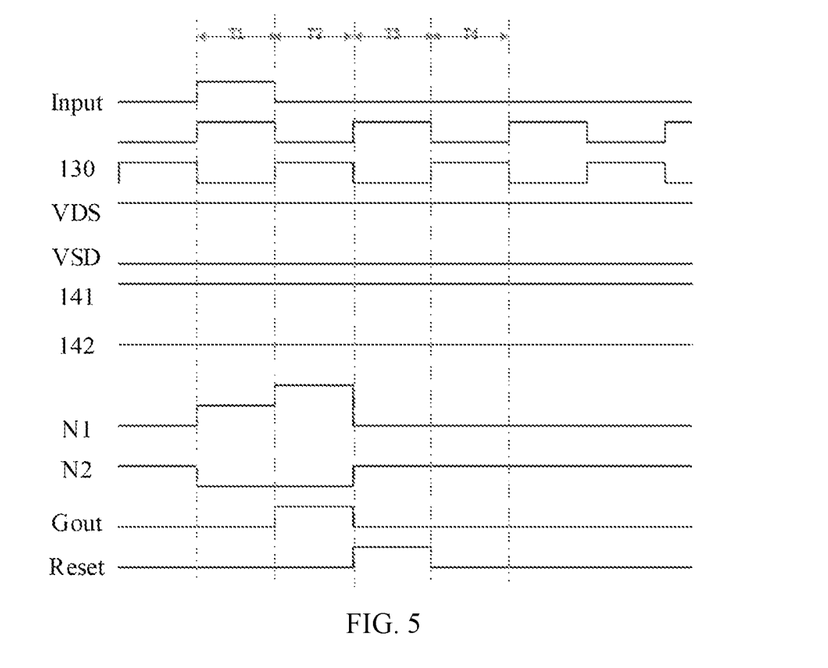
FIG. 5 is a timing diagram of driving signals of a shift register in a display substrate provided by an embodiment of the present disclosure.

As illustrated by FIG. 4 and FIG. 5, the input circuit 121 includes a control end, an input end and an output end; the output circuit 122 includes a control end, an input end and an output end; the second control circuit 124 includes a control end, an input end and an output end. The output end of the input circuit 121, the control end of the output circuit 122 and the control end of the second control short circuit 124 are connected to a first node N1; the input end of the input circuit 121 is connected with a first scanning input end VDS, and the control end of the input circuit 121 is connected with an input control end Input; the input end of the output circuit 122 is connected to the clock signal line 130, and the output end of the output circuit 122 can be used as the output end Gout of the shift register 120. The input end of the second control circuit 124 is connected to a second node N2, and the output end of the second control circuit 124 is connected to a second voltage signal end VGL. The input circuit 121 is configured to write a voltage input by the first scanning input end VDS into the first node N1 in response to a driving signal on the input control end Input; the output circuit 122 is configured to output a clock signal on the clock signal line 130 as a gate driving signal from the output end Gout in response to a voltage on the first node N1.

As illustrated by FIG. 4 and FIG. 5, the shift register 120 further includes a capacitor C, one end of the capacitor C is connected to the first node N1, and the other end of the capacitor C is connected to the output end of the output circuit 122. The capacitor C can maintain the voltage on the first node N1.

As illustrated by FIG. 4 and FIG. 5, the first control circuit 123 includes a control end, an input end and an output end; the first noise reduction circuit 125 includes a control end, an input end and an output end; the second noise reduction circuit 126 includes a control end, an input end and an output end; the output end of the first control circuit 123, the input end of the second control circuit 124, the control end of the first noise reduction circuit 125 and the control end of the second noise reduction circuit 126 are connected to the second node N2; the input end of the first control circuit 123 is connected to a first voltage signal end VDD and configured to receive the first voltage signal; the output end of the first noise reduction circuit 125 and the output end of the second noise reduction circuit 126 are respectively connected with the second voltage signal end VGL and configured to be connected with the second voltage signal. The control end and input end of the first control circuit 123 are both connected to the first voltage signal end VDD, so the first control circuit 123 can be regarded as a diode, and the first voltage signal on the first voltage signal end VDD is input to the second node N2. The second control circuit 124 is configured to respond to the voltage on the first node N1 to pull down the potential of the second node N2 through the second voltage signal on the second voltage signal end VGL. Thus, the first node N1 and the second node N2 can be mutually inverter. It should be noted that the first node N1 can be used as a pull-up node and the second node N2 can be used as a pull-down node.

As illustrated by FIG. 4 and FIG. 5, the input end of the first noise reduction circuit 125 is connected to the first node N1, and the input end of the second noise reduction circuit 126 is connected to the output end of the output circuit 122. Thus, when the voltage on the second node N2 is at a high level, the first noise reduction circuit 125 and the second noise reduction circuit 126 can respond to the voltage on the second node N2 to respectively reduce the noise for the first node N1 and the output end of the output circuit 122 through the second voltage signal on the second voltage signal end VGL.

As illustrated by FIG. 4 and FIG. 5, the input circuit 121 includes a first transistor M1 and a second transistor M2. A second electrode of the first transistor M1 is connected with a first electrode of the second transistor M2, and a gate electrode of the first transistor M1 is connected with a gate electrode of the second transistor M2 and serves as the control end of the input circuit 121. A first electrode of the first transistor M1 serves as the input end of the input circuit 121, and a second electrode of the second transistor M2 serves as the output end of the input circuit 121. The first transistor M1 and the second transistor M2 are both oxide transistors, and the second node N2 is connected to the second voltage signal only through the second control circuit 124, and the potential of the second node N2 is pulled down only through the second control circuit 124. It should be noted that the above-mentioned oxide transistor refers to a transistor in which the semiconductor layer is made of oxide semiconductor material, and the oxide semiconductor material may include indium gallium zinc oxide (IGZO).

In the display substrate provided by the embodiments of the present disclosure, because the first transistor and the second transistor are both oxide transistors, which have the advantages of high efficiency, large on-state current and the like. Therefore, the shift register adopting oxide transistors has better performance. In addition, because the input circuit includes the first transistor and the second transistor, when the first transistor is in a long-term bias state and is conductive, the second transistor can still play the function of turning off, so as to avoid current leakage phenomenon of the input circuit, thereby prolonging the service life of the shift register.

On the other hand, on the premise that the shift register adopts the above-mentioned oxide transistors, the shift register connects the second voltage signal to the second node only through the second control circuit, and the potential of the second node is pulled down only through the second control circuit, so that after the first node is reset, the second node can be pulled up to a high level, which is staggered from the noise caused by the change of the clock signal, and it is easier for the second node to be pulled up to a high level, thus avoiding poor driving of the gate driving circuit using the shift register; in addition, the shift register has a larger margin for the change of the threshold voltage of the transistor, and the shift register can still maintain stable performance after the reliability test, thus making the service life of the display substrate using the shift register longer.

In some examples, as illustrated by FIG. 3, in the display region 112, a plurality of sub-pixels 1120 are arranged in an array along the first direction X and the second direction Y to form a plurality of pixel rows arranged along the second direction Y; the gate line 1124 is connected to a plurality of sub-pixels 1120 in the same pixel row to provide gate driving signals for them.

In some examples, as illustrated by FIG. 3, the display substrate 100 may include a plurality of clock signal lines 130; each of the plurality of clock signal lines 130 may extend at least partially in the second direction Y. For the first one shift register or several registers 120, a dedicated square wave signal is provided as the start signal STV, which is used to provide the start signal at the beginning of each frame.

In some examples, as illustrated by FIG. 3, the display substrate 100 adopts a head-to-head driving mode, that is, two shift registers 120 are arranged at two sides of the same pixel row (or gate line), and gate driving signals are provided to the pixel row from both ends of the pixel row (or gate line). Of course, the embodiments of the present disclosure include but are not limited thereto, and the display substrate can also adopt an odd-even interlace driving mode, that is, one shift register is set at one side of the same pixel row (gate line), so that a gate driving signal is provided from one side of the pixel row to the pixel row (gate line), and the shift registers corresponding to the odd-numbered pixel rows are located on one side and the shift registers corresponding to the even-numbered pixel rows are located on the other side.

For example, the base substrate may be a flexible substrate or a rigid substrate, which is not limited by the embodiments of the present disclosure. The base substrate may be a glass substrate, a plastic substrate, a quartz substrate, a metal substrate, or a base substrate made of organic materials. For example, the above-mentioned organic materials may include resin materials such as polyimide, polycarbonate, polyacrylate, polyetherimide, polyethersulfone, polyethylene terephthalate and polyethylene naphthalate.

In some examples, as illustrated by FIG. 3 and FIG. 4, the display substrate 100 further includes a first voltage line 141 and a second voltage line 142 located on the base substrate 110; the first voltage line 141 is configured to apply a first voltage signal, and the second voltage line 142 is configured to apply a second voltage signal. The second node N2 is connected to the second voltage line 142 only through the second control circuit 124. Therefore, the display substrate can apply a second voltage signal to the second node through the second control circuit by using the second voltage line.

For example, the first voltage signal may be a high-level signal and the second voltage signal may be a low-level signal. Of course, embodiments of the present disclosure include but are not limited thereto.

In some examples, the channel width-length ratio of the first transistor M1 ranges from 6 to 14, and the channel width-length ratio of the second transistor M2 ranges from 6 to 14. Therefore, the first transistor M1 and the second transistor M2 have large on-state currents, so that the first node N1 can be quickly charged or discharged, and the driving performance of the shift register can be improved.

In some examples, the channel width-length ratio of the first transistor M1 ranges from 8 to 12, for example, 10; the channel width-length ratio of the second transistor M2 ranges from 8 to 12, for example, 10. Therefore, the first transistor M1 and the second transistor M2 have large on-state currents, so that the first node N1 can be quickly charged or discharged, and the driving performance of the shift register can be improved. On the other hand, when the first transistor and the second transistor adopt the above channel width-length ratios, the layout can be better optimized.

For example, the channel length of the first transistor M1 may be 5 microns, in this case, the channel width of the first transistor M1 is greater than 30 microns, for example, 50 microns; the channel length of the second transistor M2 may be 5 microns, in this case, the channel width of the second transistor M2 is greater than 30 microns, for example, 50 microns.

In some examples, as illustrated by FIG. 4 and FIG. 5, the shift register 120 further includes a third noise reduction circuit 127, a control end of the third noise reduction circuit 127 is connected to the second node N2, an input end of the third noise reduction circuit 127 is connected to the second electrode of the first transistor M1, that is, also connected to the first electrode of the second transistor M2, and an output end of the third noise reduction circuit 127 is configured to be connected with the second voltage signal; the third noise reduction circuit 127 is configured to respond to the voltage on the second node N2 to reduce the noise for the second electrode of the first transistor M1 by the second voltage signal, that is, also reduce the noise for the first electrode of the second transistor M2. Therefore, the shift register can timely reduce the noise for the second electrode of the first transistor by the third noise reduction circuit through the second voltage signal, so as to prevent the second transistor from being in a long-term bias state after the first transistor is conducted, thereby having a longer service life.

In some examples, as illustrated by FIG. 4 and FIG. 5, the third noise reduction transistor 127 includes a third transistor M3; a gate electrode of the third transistor M3 serves as the control end of the third noise reduction circuit 127 and is connected to the second node N2. A first electrode of the third transistor M3 serves as the input end of the third noise reduction circuit 127 and is connected with the second electrode of the first transistor M1; a second electrode of the third transistor M3 serves as the output end of the third noise reduction circuit 127 and is connected to the second voltage line 142 and configured to receive the second voltage signal.

In some examples, the channel length of the third transistor M3 is greater than 5 microns, for example, 8 microns, so that the ability of high voltage resistance can be improved, and the noise of the second electrode of the first transistor can be better reduced after the first transistor is conducted.

In some examples, as illustrated by FIG. 4 and FIG. 5, the shift register 120 further includes a reset circuit 128, an input end of the reset circuit 128 is connected to the first node N1, and an output end of the reset circuit 128 is connected to a second scanning input end VSD; the reset circuit 128 is configured to respond to a reset signal on the control end of the reset circuit 128 to reset the first node N1 through the second scanning input end VSD. It should be noted that what is described here is the case of forward scanning, in which the first scanning input end is a high-level signal and the second scanning input end is a low-level signal; however, the embodiments of the present disclosure include but are not limited thereto, and the display substrate can also perform reverse scanning, in which the first scanning input end is a low-level signal and the second scanning input end is a high-level signal.

In some examples, as illustrated by FIG. 4 and FIG. 5, the reset circuit 128 includes a fourth transistor M4 and a fifth transistor M5, and a gate electrode of the fourth transistor M4 is connected with a gate electrode of the fifth transistor M5 and serves as the control end of the reset transistor 128 to be connected with a reset signal; a first electrode of the fourth transistor M4 is connected with a second electrode of the fifth transistor M5, and a second electrode of the fourth transistor M4 serves as the output end of the reset circuit 128, and a first electrode of the fifth transistor M5 serves as the input end of the reset circuit 128; the fourth transistor M4 and the fifth transistor M5 are oxide transistors.

In the display substrate provided by this example, because the fourth transistor and the fifth transistor are oxide transistors, which have the advantages of high efficiency, large on-state current and the like. Therefore, the shift register adopting the oxide transistors has better performance. In addition, because the reset circuit includes the fourth transistor and the fourth transistor, when the fourth transistor is in a long-term bias state and is conductive, the fifth transistor can still play the function of turning off, so as to avoid current leakage phenomenon of the input circuit, thereby prolonging the service life of the shift register. It should be noted that the above reset circuit can be used as an input circuit when performing reverse scanning, and the above input circuit can be used as a reset circuit.

In some examples, as illustrated by FIG. 4 and FIG. 5, the channel width-length ratio of the fourth transistor M4 ranges from 6 to 14, and the channel width-length ratio of the fifth transistor M5 ranges from 6 to 14. Therefore, the fourth transistor M4 and the fifth transistor M5 have large on-state currents, so that the first node N1 can be quickly charged or discharged, and the driving performance of the shift register can be improved.

In some examples, the channel width-length ratio of the fourth transistor M4 ranges from 8 to 12, for example, 10; the channel width-length ratio of the fifth transistor M5 ranges from 8 to 12, for example, 10. Therefore, the fourth transistor M4 and the fifth transistor M5 have large on-state currents, so that the first node N1 can be quickly charged or discharged, thereby improving the driving performance of the shift register. On the other hand, when the fourth transistor and the fifth transistor adopt the above channel width-length ratios, the layout can be better optimized.

For example, the channel length of the fourth transistor M4 may be 5 microns, in this case, the channel width of the fourth transistor M4 is greater than 30 microns, for example, 50 microns; the channel length of the fifth transistor M5 may be 5 microns, in this case, the channel width of the fifth transistor M2 is greater than 30 microns, for example, 50 microns.

In some examples, as illustrated by FIG. 4 and FIG. 5, the shift register 120 further includes a fourth noise reduction circuit 129, a control end of the fourth noise reduction circuit 129 is connected to the second node N2, an input end of the fourth noise reduction circuit 129 is connected to the first electrode of the fourth transistor M4, that is, also connected to the second electrode of the fifth transistor M5, and an output end of the fourth noise reduction circuit 129 is configured to be connected with the second voltage signal. The fourth noise reduction circuit 129 is configured to respond to the voltage on the second node N2 to reduce the noise for the first electrode of the fourth transistor M4 through the second voltage signal. Therefore, the shift register can timely reduce the noise for the first electrode of the fourth transistor by the fourth noise reduction circuit through the second voltage signal, so as to prevent the fifth transistor from being in a long-term bias state after the fourth transistor is conducted, thereby having a longer service life.

In some examples, as illustrated by FIG. 4 and FIG. 5, the fourth noise reduction transistor 129 includes a sixth transistor M6, a gate electrode of the sixth transistor M6 serves as the control end of the fourth noise reduction circuit 129, a first electrode of the sixth transistor M6 serves as the input end of the fourth noise reduction circuit 129, and a second electrode of the sixth transistor M6 serves as the output end of the fourth noise reduction circuit 129.

In some examples, the channel length of the sixth transistor M6 is greater than 5 microns, for example, 8 microns, so that the ability of high voltage resistance can be improved, and thus the noise of the first electrode of the fourth transistor can be better reduced after the conductor of the fourth transistor occurs.

In some examples, as illustrated by FIG. 4 and FIG. 5, the first control circuit 123 includes a seventh transistor M7, a first electrode of the seventh transistor M7 serves as the input end of the first control circuit 123, a second electrode of the seventh transistor M7 serves as the output end of the first control circuit 123, and a gate electrode of the seventh transistor M7 serves as the control end of the first control circuit 123.

For example, as illustrated by FIG. 4 and FIG. 5, the gate electrode and the first electrode of the seventh transistor M7 are both connected to the first voltage line 141, the seventh transistor M7 can be regarded as a diode to apply the first voltage signal to the second node N2.

In the research, the inventor(s) of the present application has noticed that: because the first electrode of the seventh transistor is connected to the first voltage line, and the first voltage line usually has large static electricity, so the seventh transistor is prone to TFT characteristic damage due to static electricity discharge. Therefore, the seventh transistor is required to have strong anti-static discharge ability. In this regard, the present disclosure also provides a transistor with strong anti-static discharge ability.

Figure 6:
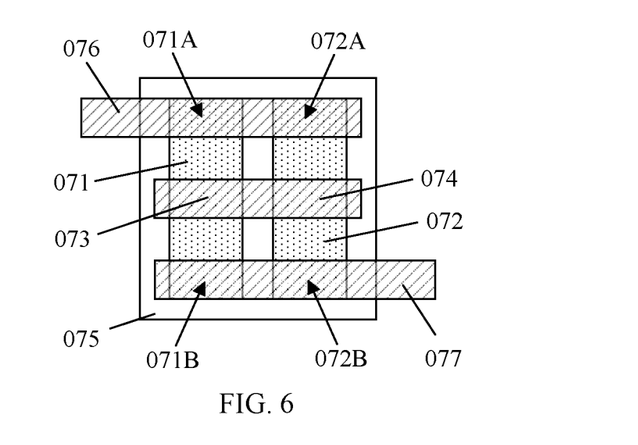
FIG. 6 is a schematic diagram of a seventh transistor in a display substrate provided by an embodiment of the present disclosure.

FIG. 6 is a schematic diagram of a seventh transistor in a display substrate provided by an embodiment of the present disclosure. As illustrated by FIG. 6, the seventh transistor M7 includes a first semiconductor block 071, a second semiconductor block 072, a first floating electrode 073 and a second floating electrode 074. The first semiconductor block 071 includes a first end 071A and a second end 071B; the second semiconductor block 072 includes a third end 072A and a fourth end 072B; the first floating electrode 073 is overlapped (in contact and connected) with the first semiconductor block 071 and is located between the first end 071A and the second end 071B. The second floating electrode 074 is overlapped (in contact and connected) with the second semiconductor block 072 and is located between the third end 072A and the fourth end 072B. The first electrode 076 of the seventh transistor M7 is connected to the first end 071A and the third end 072A, and the second electrode 077 of the seventh transistor M7 is connected to the second end 071B and the fourth end 072B. In this way, the seventh transistor has two channels, so that the anti-static discharge ability can be improved; and the first floating electrode and the second floating electrode can increase the lengths of the first semiconductor block and the second semiconductor block without changing the channel width-length ratio. Therefore, the seventh transistor can greatly improve the anti-static discharge ability, so that the shift register has better stability and longer service life.

In some examples, as illustrated by FIG. 6, the first floating electrode 073 and the second floating electrode 074 are in a continuous integrated structure.

In some examples, as illustrated by FIG. 6, the first semiconductor block 071 and the second semiconductor block 072 are located in the same layer and arranged at intervals; the gate electrode 075 of the seventh transistor M7 is located at a side of the first semiconductor block 071 and the second semiconductor block 072 away from the first floating electrode 073 and the second floating electrode 074. It should be noted that a gate insulating layer is provided between the first electrode 076 of the seventh transistor M7 and the first semiconductor block 071 as well as the second semiconductor block 072; a gate insulating layer is provided between the second electrode 077 of the seventh transistor M7 and the first semiconductor block 071 as well as the second semiconductor block 072.

In some examples, the channel width-length ratio of the seventh transistor M7 is 1:1; for example, the channel width of the seventh transistor M7 is 10 microns, and the channel length of the seventh transistor M7 is 10 microns.

In some examples, the second control circuit 124 includes an eighth transistor M8; a gate electrode of the eighth transistor M8 serves as the control end of the second control circuit 124 and is connected to the first node N1; a first electrode of the eighth transistor M8 serves as the input end of the second control circuit 124 and is connected to the second node N2; and a second electrode of the eighth transistor M8 serves as the output end of the second control circuit 124 and is connected to the second voltage line 142.

In some examples, the output circuit 122 includes a ninth transistor M9; a gate electrode of the ninth transistor M9 serves as the control end of the output circuit 122 and is connected to the first node N1; a first electrode of the ninth transistor M9 serves as the input end of the output circuit 122 and is connected to the clock signal line 130; and a second electrode of the ninth transistor M9 serves as the output end of the output circuit 122 and serves as the output end Gout of the shift register 120.

In some examples, the first noise reduction circuit 125 includes a tenth transistor M10, and the second noise reduction circuit 126 includes an eleventh transistor M11; a gate electrode of the tenth transistor M10 serves as the control end of the first noise reduction circuit 125 and is connected to the second node N2; a first electrode of the tenth transistor M10 serves as the input end of the first noise reduction circuit 125 and is connected to the first node N1; and a second electrode of the tenth transistor M10 serves as the output end of the first noise reduction circuit 125 and is connected to the second voltage line 142. A gate electrode of the eleventh transistor M11 serves as the control end of the second noise reduction circuit 126 and is connected to the second node N2; a first electrode of the eleventh transistor M11 serves as the input end of the second noise reduction circuit 126 and is connected with the output end of the output circuit 122; and a second electrode of the eleventh transistor M11 serves as the output end of the second noise reduction circuit 126 and is connected to the second voltage line 142.

In some examples, as illustrated by FIG. 4 and FIG. 5, the shift register 120 further includes a first clearing circuit 210 and a second clearing circuit 220; an input end of the first clearing circuit 210 is connected with the first node N1, an output end of the first clearing circuit 210 is configured to be connected with the second voltage signal, and an input end of the second clearing circuit 220 is connected with the output end, and an output end of the second clearing circuit 220 is configured to be connected with the second voltage signal; the first clearing circuit 210 is configured to respond to a clearing control signal to reset the first node N1 through the second voltage signal, and the second clearing circuit 220 is configured to respond to a clearing control signal to reset the output end through the second voltage signal.

In some examples, as illustrated by FIG. 4 and FIG. 5, the first clearing circuit 210 includes a twelfth transistor M12, and the second clearing circuit 220 includes a thirteenth transistor M13. A gate electrode of the twelfth transistor M12 is the control end of the first clearing circuit 210, a first electrode of the twelfth transistor M12 is the input end of the first clearing circuit 210, and a second electrode of the twelfth transistor M12 is the output end of the first clearing circuit 210. A gate electrode of the thirteenth transistor M13 is the control end of the second clearing circuit 220, a first electrode of the thirteenth transistor M13 is the input end of the second clearing circuit 220, and a second electrode of the thirteenth transistor M13 is the output end of the second clearing circuit 220.

Hereinafter, a working mode of the shift register provided by the embodiments of the present disclosure will be described with reference to the shift register shown in FIG. 4 and the timing diagram shown in FIG. 5. It should be noted that the embodiments of the present disclosure include but are not limited to the following specific working mode.

As illustrated by FIG. 4 and FIG. 5, in the T1 stage, the start signal Input is at a high level, and the first transistor M1 and the second transistor M2 respond to the start signal Input to write a high-level signal connected to the first scanning input end VDS into the first node N1; at the same time, the eighth transistor M8 responds to the voltage on the first node N1 to pull down the potential of the second node N2 through the second voltage signal.

As illustrated by FIG. 4 and FIG. 5, in the T2 stage, the start signal Input is at a low level, and the first transistor M1 and the second transistor M2 are turned off; the first node N1 is pulled high again under the bootstrap function of the capacitor C, and the ninth transistor M9 responds to the voltage on the first node N1 and outputs the clock signal on the clock signal line 130.

As illustrated by FIG. 4 and FIG. 5, in the T3 stage, the reset signal Reset is at a high level, and the fourth transistor M4 and the fifth transistor M5 respond to the reset signal and pull down the potential of the first node N1 through the second voltage signal; at the same time, the seventh transistor M7 charges the second node N2, and the potential of the second node N2 is pulled up. The tenth transistor M10 and the eleventh transistor M11 respond to the voltage on the second node N2, and respectively reduce the noise for the first node N1 and the output end Gout of the shift register through the second voltage signal.

As illustrated by FIG. 4 and FIG. 5, in the T4 stage, the potential of the second node N2 is pulled high. The tenth transistor M10 and the eleventh transistor M11 respond to the voltage on the second node N2, and respectively reduce the noise for the first node N1 and the output end Gout of the shift register through the second voltage signal.

Therefore, the shift register connects the second voltage signal to the second node only through the second control circuit, and pulls down the potential of the second node only through the second control circuit, so that after the first node is reset, the second node can be pulled up to a high level, which is staggered from the noise caused by the change of the clock signal, and it is easier for the second node to be pulled up to a high level, thus avoiding poor driving of the gate driving circuit using the shift register; in addition, the shift register has a larger margin for the change of the threshold voltage of the transistor, and the shift register can still maintain stable performance after the reliability test, thus making the service life of the display substrate using the shift register longer.

It should be noted that the transistors in the above embodiments may all be thin film transistors, field effect transistors, or other switching devices with the same characteristics; the transistors in the above embodiments may all be oxide transistors. Take a thin film transistor as an example, an active layer (channel region) of the transistor is made of oxide semiconductor material, such as indium gallium tin oxide (IGZO), and the gate electrode, source electrode and drain electrode are made of metal materials, such as aluminum or aluminum alloy. The source electrode and drain electrode of the transistor used here may be symmetrical in structure, so there may be no difference in structure between the source electrode and drain electrode. In the embodiments of the present disclosure, in order to distinguish the two electrodes of the transistor except the gate electrode, one of the source electrode and the drain electrode is directly described as the first electrode and the other as the second electrode.

Figure 7:
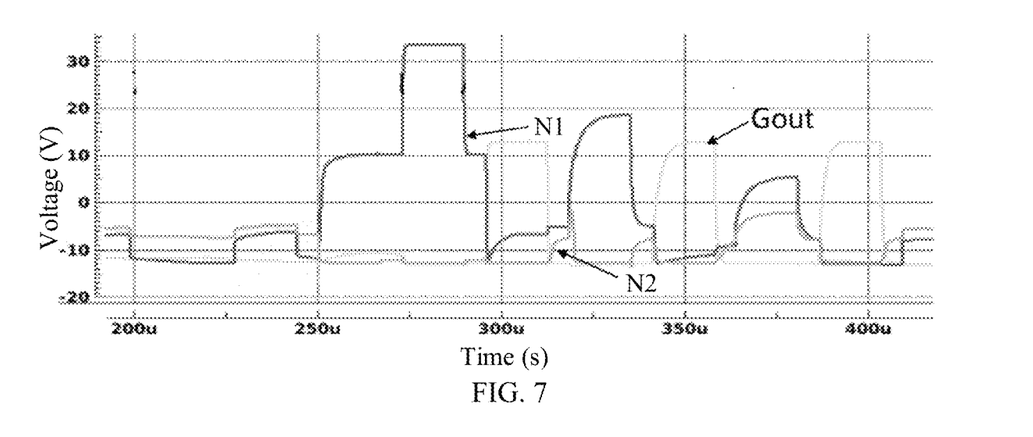
FIG. 7 is a simulation result diagram of a shift register provided by the present disclosure.
Figure 8:
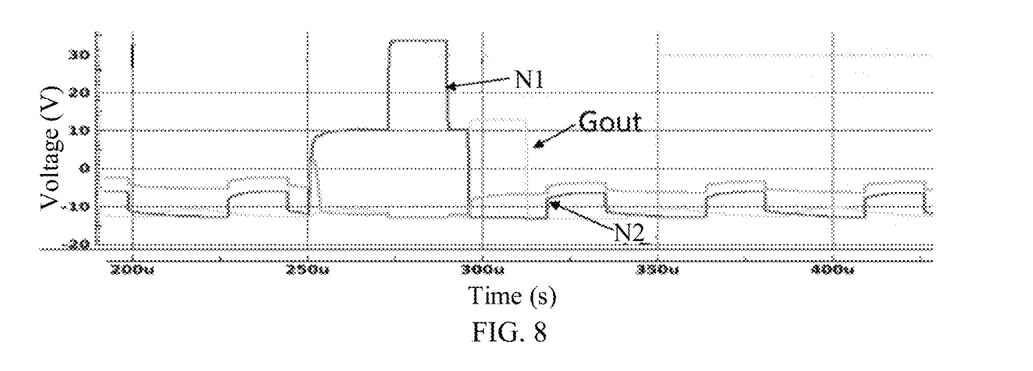
FIG. 8 is a simulation result diagram of a shift register provided by an embodiment of the present disclosure.

FIG. 7 is a simulation result diagram of a shift register provided by the present disclosure; and FIG. 8 is a simulation result diagram of a shift register provided by an embodiment of the present disclosure. FIG. 7 is a timing diagram of various signals of the shift register (15T1C) shown in FIG. 1, and FIG. 8 is a timing diagram of various signals of the shift register (13T1C) shown in FIG. 4.

As illustrated by FIG. 7, after the first node N1 is reset, the first node N1 is affected by the noise of the clock signal, which makes it difficult for the second node N2 to be pulled high, thus causing the shift register to output other pulse signals, resulting in poor driving.

As illustrated by FIG. 8, after the first node of the shift register provided by the embodiments of the present disclosure is reset, the second node can be pulled up to a high level, which is staggered from the noise caused by the change of the clock signal, and it is easier for the second node to be pulled up to a high level, thus avoiding outputting other pulse signals. Therefore, the gate driving circuit using the shift register can avoid poor driving.

Figure 9:
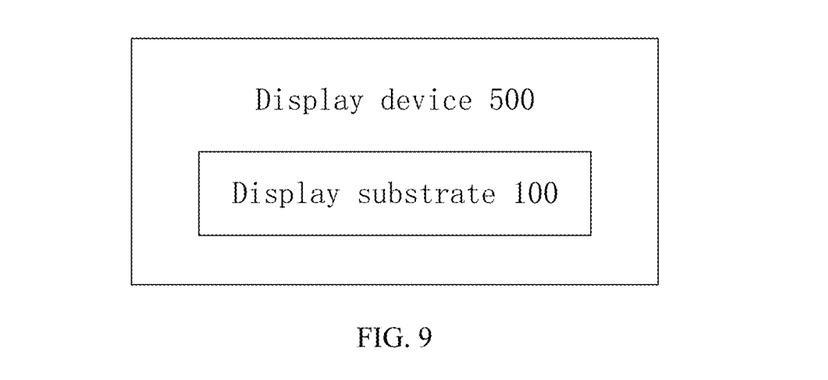
FIG. 9 is a schematic diagram of a display device provided by an embodiment of the present disclosure.

At least one embodiment of the present disclosure also provides a display device. FIG. 9 is a schematic diagram of a display device provided by an embodiment of the present disclosure. As illustrated by FIG. 9, the display device 500 includes the display substrate 100 provided by any of the above embodiments. Therefore, the display device can have better performance, higher reliability and longer service life.

For example, the display device may be a TV set, a monitor, an electronic image frame, an electronic photo frame, a navigator, a notebook computer, a tablet computer, a smart phone and other electronic products with display functions.

At least one embodiment of the present disclosure further provides a manufacturing method of the display substrate. The manufacturing method can be used for manufacturing the display substrate provided by any embodiment of the present disclosure. For example, it can be used to manufacture the display substrate shown in FIG. 3. The manufacturing method of the display substrate includes: steps S101 to S102.

Step S110: providing a base substrate.

For example, the base substrate may be a flexible substrate or a rigid substrate, which is not limited by the embodiments of the present disclosure. The base substrate may be a glass substrate, a plastic substrate, a quartz substrate, a metal substrate, or a base substrate made of organic materials. For example, the above-mentioned organic materials may include resin materials such as polyimide, polycarbonate, polyacrylate, polyetherimide, polyethersulfone, polyethylene terephthalate and polyethylene naphthalate.

Step S102: forming a shift register and a clock signal line on the base substrate; the shift register includes an input circuit, an output circuit, a first control circuit, a second control circuit, a first noise reduction circuit and a second noise reduction circuit; an output end of the input circuit, a control end of the output circuit and a control end of the second control circuit are connected to a first node, an input end of the input circuit is connected to a first scanning input end, and an input end of the output circuit is connected to the clock signal line; an output end of the first control circuit, an input end of the second control circuit, a control end of the first noise reduction circuit and a control end of the second noise reduction circuit are connected to a second node, an input end of the first control circuit is configured to be connected with a first voltage signal, and an output end of the first noise reduction circuit and an output end of the second noise reduction circuit are configured to be connected with a second voltage signal; the input circuit includes a first transistor and a second transistor; a second electrode of the first transistor is connected with a first electrode of the second transistor, a gate electrode of the first transistor is connected with a gate electrode of the second transistor and serves as the control end of the input circuit; a first electrode of the first transistor serves as the input end of the input circuit, and a second electrode of the second transistor serves as the output end of the input circuit. Both the first transistor and the second transistor are oxide transistors. The second node is connected with the second voltage signal only through the second control circuit, and the potential of the second node is pulled down only through the second control circuit.

For the technical effects of the manufacturing method of the display substrate provided in the above embodiment, please refer to the technical effects of the display substrate provided in the embodiments of the present disclosure, and the details are not repeated here.

In some examples, forming the shift register on the base substrate includes sequentially forming a semiconductor layer, a first insulating layer, a first conductive layer, a second insulating layer, a second conductive layer, a third insulating layer and a third conductive layer in a direction perpendicular to the base substrate. The semiconductor layer may include the active layer of the transistor used in the shift register; the first insulating layer may be the gate insulating layer of the transistor used in the shift register; the first conductive layer may include the gate electrode of the transistor used in the shift register; the second conductive layer may include the first electrode and the second electrode of the transistor used in the shift register; and the third conductive layer may include the conductive block, the connection electrode and other connection structures for connecting different transistors.

For example, the first insulating layer, the second insulating layer and the third insulating layer may adopt inorganic insulating materials, such as silicon oxide, silicon nitride or silicon oxynitride, and may also use organic insulating materials, such as resin.

For example, sequentially forming the semiconductor layer, the first insulating layer, the first conductive layer, the second insulating layer, the second conductive layer, the third insulating layer and the third conductive layer in the direction perpendicular to the base substrate includes: forming a corresponding material layer (for example, a semiconductor material layer, an insulating material layer or a conductive material layer), and then using a patterning process to form a corresponding pattern structure (for example, an active layer, an electrode pattern, a wiring line, a via, etc.). The patterning process is, for example, a photolithography process, which includes, for example, coating a photoresist layer on a material layer to be patterned, exposing the photoresist layer with a mask plate, developing the exposed photoresist layer to obtain a photoresist pattern, etching the structural layer with the photoresist pattern, and then optionally removing the photoresist pattern.

It should be noted that in various embodiments of the present disclosure, the flow of the manufacturing method of the display substrate may include more or less operations, which may be performed sequentially or in parallel. Although the flow of the manufacturing method described above includes a plurality of operations appearing in a specific order, it should be clearly understood that the order of the plurality of operations is not limited. The manufacturing method described above can be performed once or multiple times according to predetermined conditions.

The following statements should be noted:
(1) The drawings involve only the structure(s) in connection with the embodiment(s) of the present disclosure, and other structure(s) can be referred to common design(s).
(2) In case of no conflict, features in one embodiment or in different embodiments can be combined to obtain new embodiments.

The above is only the specific embodiment of the present disclosure, but the protection scope of the present disclosure is not limited thereto. Any person familiar with the technical field can easily think of changes or substitutions within the technical scope disclosed in the present disclosure, and they should be included in the protection scope of the present disclosure. Therefore, the scope of protection of the present disclosure should be based on the scope of protection of the claims.

The invention claimed is:

1. A display substrate, comprising:
 a base substrate, wherein a shift register and a clock signal line are on the base substrate;
 wherein the shift register comprises: an input circuit, an output circuit, a first control circuit, a second control circuit, a first noise reduction circuit and a second noise reduction circuit;
 an output end of the input circuit, a control end of the output circuit and a control end of the second control circuit are connected to a first node, an input end of the input circuit is connected to a first scanning input end, and an input end of the output circuit is connected to the clock signal line;
 an output end of the first control circuit, an input end of the second control circuit, a control end of the first noise reduction circuit and a control end of the second noise reduction circuit are connected to a second node, an input end of the first control circuit is configured to be connected with a first voltage signal, and an output end of the first noise reduction circuit and an output end of the second noise reduction circuit are configured to be connected with a second voltage signal;
 the input circuit comprises a first transistor and a second transistor, a second electrode of the first transistor is connected with a first electrode of the second transistor, a gate electrode of the first transistor is connected with a gate electrode of the second transistor and serves as a control end of the input circuit, a first electrode of the first transistor serves as the input end of the input circuit, and a second electrode of the second transistor serves as the output end of the input circuit,
 the first transistor and the second transistor are both oxide transistors, and the second node is connected to the second voltage signal only through the second control circuit, and a potential of the second node is pulled down only through the second control circuit;
 the first control circuit comprises: a seventh transistor, a first electrode of the seventh transistor serves as the input end of the first control circuit, a second electrode of the seventh transistor serves as the output end of the first control circuit, and a gate electrode of the seventh transistor serves as the control end of the first control circuit;
 the seventh transistor comprises:
 a first semiconductor block, comprising a first end and a second end;
 a second semiconductor block, comprising a third end and a fourth end; and
 a first floating electrode, overlapped with the first semiconductor block and located between the first end and the second end; and
 a second floating electrode, overlapped with the second semiconductor block and located between the third end and the fourth end,
 wherein a first electrode of the seventh transistor is connected with the first end and the third end, and a second electrode of the seventh transistor is connected with the second end and the fourth end.

2. The display substrate according to claim 1, further comprising: a first voltage line and a second voltage line on the base substrate, wherein the first voltage line is configured to apply the first voltage signal and the second voltage line is configured to apply the second voltage signal;
 the second node is connected to the second voltage line only through the second control circuit.

3. The display substrate according to claim 1, wherein a channel width-length ratio of the first transistor ranges from 6 to 14, and a channel width-length ratio of the second transistor ranges from 6 to 14.

4. The display substrate according to claim 1, wherein the shift register further comprises: a third noise reduction circuit, a control end of the third noise reduction circuit is connected to the second node, an input end of the third noise reduction circuit is connected to the second electrode of the first transistor, and an output end of the third noise reduction circuit is configured to be connected to the second voltage signal;
 the third noise reduction circuit is configured to respond to a voltage on the second node to reduce noise for the second electrode of the first transistor by the second voltage signal.

5. The display substrate according to claim 4, wherein the third noise reduction circuit comprises: a third transistor, a gate electrode of the third transistor serves as the control end of the third noise reduction circuit, a first electrode of the third transistor serves as the input end of the third noise reduction circuit, and a second electrode of the third transistor serves as the output end of the third noise reduction circuit.

6. The display substrate according to claim 5, wherein a channel length of the third transistor is greater than 5 microns.

7. The display substrate according to claim 1, wherein the shift register further comprises: a reset circuit, an input end of the reset circuit is connected to the first node, and an output end of the reset circuit is connected to a second scanning input end;

the reset circuit is configured to respond to a reset signal on a control end of the reset circuit to reset the first node through the second scanning input end.

8. The display substrate according to claim 7, wherein the reset circuit comprises: a fourth transistor and a fifth transistor, a gate electrode of the fourth transistor is connected with a gate electrode of the fifth transistor and serves as the control end of the reset transistor, a first electrode of the fourth transistor is connected with a second electrode of the fifth transistor, a second electrode of the fourth transistor serves as the output end of the reset circuit, and a first electrode of the fifth transistor serves as the input end of the reset circuit, the fourth transistor and the fifth transistor are oxide transistors.

9. The display substrate according to claim 7, wherein the shift register further comprises: a fourth noise reduction circuit, a control end of the fourth noise reduction circuit is connected to the second node, an input end of the fourth noise reduction circuit is connected to a first electrode of the fourth transistor, and an output end of the fourth noise reduction circuit is configured to be connected to the second voltage signal;

the fourth noise reduction circuit is configured to respond to a voltage on the second node to reduce noise for the first electrode of the fourth transistor by the second voltage signal.

10. The display substrate according to claim 9, wherein the fourth noise reduction transistor comprises: a sixth transistor, a gate electrode of the sixth transistor serves as the control end of the fourth noise reduction circuit, a first electrode of the sixth transistor serves as the input end of the fourth noise reduction circuit, and a second electrode of the sixth transistor serves as the output end of the fourth noise reduction circuit.

11. The display substrate according to claim 10, wherein a channel length of the sixth transistor is greater than 5 microns.

12. The display substrate according to claim 1, wherein the first floating electrode and the second floating electrode are in a continuous integrated structure.

13. The display substrate according to claim 1, wherein the second control circuit comprises: an eighth transistor, a gate electrode of the eighth transistor serves as the control end of the second control circuit, a first electrode of the eighth transistor serves as the input end of the second control circuit, and a second electrode of the eighth transistor serves as the output end of the second control circuit.

14. The display substrate according to claim 1, wherein the output circuit comprises: a ninth transistor, a gate electrode of the ninth transistor serves as the control end of the output circuit, a first electrode of the ninth transistor serves as the input end of the output circuit, and a second electrode of the ninth transistor serves as the output end of the output circuit.

15. The display substrate according to claim 1, wherein the first noise reduction circuit comprises: a tenth transistor, the second noise reduction circuit comprises an eleventh transistor, a gate electrode of the tenth transistor serves as the control end of the first noise reduction circuit, a first electrode of the tenth transistor serves as the input end of the first noise reduction circuit, and a second electrode of the tenth transistor serves as the output end of the first noise reduction circuit, a gate electrode of the eleventh transistor serves as the control end of the second noise reduction circuit, a first electrode of the eleventh transistor serves as the input end of the second noise reduction circuit, and a second electrode of the eleventh transistor serves as the output end of the second noise reduction circuit.

16. The display substrate according to claim 1, wherein the shift register further comprises: a first clearing circuit and a second clearing circuit;

an input end of the first clearing circuit is connected with the first node, an output end of the first clearing circuit is configured to be connected with the second voltage signal, an input end of the second clearing circuit is connected with the output end of the output circuit, and an output end of the second clearing circuit is configured to be connected with the second voltage signal;

the first clearing circuit is configured to respond to a clearing control signal to reset the first node through the second voltage signal, and the second clearing circuit is configured to respond to a clearing control signal to reset the output end of the output circuit through the second voltage signal.

17. The display substrate according to claim 16, wherein the first clearing circuit comprises: a twelfth transistor, the second clearing circuit comprises a thirteenth transistor, a gate electrode of the twelfth transistor is a control end of the first clearing circuit, a first electrode of the twelfth transistor is the input end of the first clearing circuit, and a second electrode of the twelfth transistor is the output end of the first clearing circuit, a gate electrode of the thirteenth transistor is a control end of the second clearing circuit, a first electrode of the thirteenth transistor is the input end of the second clearing circuit, and a second electrode of the thirteenth transistor is the output end of the second clearing circuit.

18. A display device, comprising the display substrate according to claim 1.

* * * * *